UNITED STATES PATENT OFFICE.

NAPOLÉON DUÉDAL MÉNÉGAL, OF LEADVILLE, COLORADO, ASSIGNOR OF ONE-HALF TO AMOS HENDERSON AND HARRY WILLIAMS, OF SAME PLACE.

NON-CONDUCTING AND WATERPROOF CEMENT.

SPECIFICATION forming part of Letters Patent No. 507,662, dated October 31, 1893.

Application filed July 29, 1893. Serial No. 481,835. (No model.)

*To all whom it may concern:*

Be it known that I, NAPOLÉON DUÉDAL MÉNÉGAL, a citizen of France, residing at Leadville, Lake county, Colorado, have invented certain new and useful Improvements in Non-Conducting and Waterproof Cements; and I do declare the following to be a full, clear, and exact description of the invention, such as will enable others skilled in the art to which it appertains to make and use the same.

My cement is intended for covering steam boilers, steam pipes and pump lines of all kinds, and the object is to produce a cement that shall be water proof as well as being a non-conductor of heat. A further object is to provide a cement that can be used for mending cracked steam boilers, pipes and other articles.

For making one ton of my compound the following materials and proportions are found to render the best result, and they are: white clay, one barrel, (flour size;) yellow ocher, twenty-five pounds; iron filings, fifty pounds; cocoanut fiber, ten pounds; wool, ten pounds; flour, fifty pounds; charcoal, twenty pounds; lubricating oil, four gallons.

In preparing my cement the ingredients are prepared in the proportions stated and placed in any well known mixer in the order stated, and when the parts are thoroughly incorporated, the cement is ready for use.

In covering steam boilers, pipes, &c., to retain the heat and thus a saving of fuel, the cement is applied in the usual way. The lubricating oil renders the other ingredients into a paste admitting the cement being readily applied. It quickly sets and when the parts are properly covered, forms a durable non-conducting covering.

For stopping cracks in steam boilers, pipes and other places under pressure, my cement has been found to effectually prevent leaks and for this purpose can be kept in a closed vessel like putty and used at any time.

It will thus be seen that I have provided a cement that is not only a non-conductor, but is water proof, which fact admits of its use in places to which the ordinary cement now used is not adapted.

Having thus fully described my invention, what I claim as new, and desire to secure by Letters Patent, is—

A waterproof and non-conducting cement, consisting of white clay, yellow ocher, iron filings, cocoanut fiber, wool, flour, charcoal and lubricating oil substantially in the proportions stated and for the purpose set forth.

In testimony whereof I affix my signature in presence of two witnesses.

NAPOLÉON DUÉDAL MÉNÉGAL.

Witnesses:
WM. ELIOT HUGO
JNO. J. CHINN.